(12) United States Patent
Bordne et al.

(10) Patent No.: US 9,567,908 B2
(45) Date of Patent: Feb. 14, 2017

(54) MITIGATING VORTEX PUMPING EFFECT UPSTREAM OF OIL SEAL

(71) Applicant: General Electric Company, Schenectady, NY (US)

(72) Inventors: Christopher Mark Bordne, Marblehead, MA (US); Duane Howard Anstead, Fairfield, OH (US); James John Luz, Tewksbury, MA (US)

(73) Assignee: General Electric Company, Schenectady, NY (US)

( * ) Notice: Subject to any disclaimer, the term of this patent is extended or adjusted under 35 U.S.C. 154(b) by 610 days.

(21) Appl. No.: 13/713,013

(22) Filed: Dec. 13, 2012

(65) Prior Publication Data
US 2013/0283757 A1    Oct. 31, 2013

Related U.S. Application Data

(60) Provisional application No. 61/639,315, filed on Apr. 27, 2012.

(51) Int. Cl.
*F16J 15/447*  (2006.01)
*F02C 7/06*    (2006.01)
(Continued)

(52) U.S. Cl.
CPC .............. *F02C 7/06* (2013.01); *F01D 25/125* (2013.01); *F01D 25/183* (2013.01); *Y02T 50/675* (2013.01)

(58) Field of Classification Search
CPC ...... F16J 15/442; F16J 15/164; F16J 15/3292; F16J 15/445; F16J 15/3288; F02C 7/06; F01D 25/125; F01D 25/183; Y02T 50/675
(Continued)

(56) References Cited

U.S. PATENT DOCUMENTS 3,085,809 A * 4/1963 Cooper ............... F16J 15/445
                                                277/415
3,501,089 A * 3/1970 Alford ........................ 184/6.11
(Continued)

FOREIGN PATENT DOCUMENTS

EP    1820944 A2    8/2007
EP    1890005       2/2008
(Continued)

OTHER PUBLICATIONS

Search Report and Written Opinion from corresponding EP Application No. 13165398, dated Jul. 26, 2013.
(Continued)

*Primary Examiner* — Kristina Fulton
*Assistant Examiner* — Nathan Cumar
(74) *Attorney, Agent, or Firm* — General Electric Company; Pamela A. Kachur (57) ABSTRACT

Oil sump seal pressurization apparatus for a turbine engine are disclosed. An example oil sump seal pressurization apparatus may include an oil sump comprising at least one bearing mounted therein; an oil seal operatively disposed between a non-rotating structural member of the sump and the shaft; a generally radially inwardly oriented passage arranged to supply pressurization air to the outward side of the oil seal; a generally radially outwardly oriented pathway arranged to receive at least some of the pressurization air from the passage, the pathway being at least partially defined by a generally radially outwardly extending arm disposed on the shaft, the arm rotating with the shaft; and/or a windage shield at least partially separating the passage and the pathway, the windage shield being operatively mounted to the non-rotating structural member of the sump.

20 Claims, 3 Drawing Sheets

(51) Int. Cl.
*F01D 25/12* (2006.01)
*F01D 25/18* (2006.01)

(58) Field of Classification Search
USPC ................ 277/409, 411, 412, 415, 421
See application file for complete search history.

(56) References Cited

U.S. PATENT DOCUMENTS

| | | | |
|---|---|---|---|
| 3,527,054 A * | 9/1970 | Hemsworth | 60/39.08 |
| 3,528,241 A | 9/1970 | Venable | |
| 3,537,713 A | 11/1970 | Matthews et al. | |
| 3,989,410 A * | 11/1976 | Ferrari | 415/115 |
| 4,190,397 A * | 2/1980 | Schilling et al. | 415/112 |
| 4,397,471 A | 8/1983 | Feldman et al. | |
| 4,645,415 A * | 2/1987 | Hovan et al. | 415/115 |
| 5,090,865 A | 2/1992 | Ramachandran et al. | |
| 5,190,440 A | 3/1993 | Maier et al. | |
| 5,218,816 A | 6/1993 | Plemmons et al. | |
| 5,301,957 A * | 4/1994 | Hwang et al. | 277/350 |
| 6,350,102 B1 | 2/2002 | Bailey et al. | |
| 6,398,486 B1 | 6/2002 | Storey et al. | |
| 6,470,666 B1 * | 10/2002 | Przytulski et al. | 60/772 |
| 6,481,959 B1 | 11/2002 | Morris et al. | |
| 6,761,034 B2 | 7/2004 | Niday et al. | |
| 7,677,048 B1 | 3/2010 | Brostmeyer et al. | |
| 2003/0011135 A1 * | 1/2003 | Meacham | 277/408 |
| 2003/0097872 A1 * | 5/2003 | Granitz | F01D 25/20 73/112.01 |
| 2003/0110778 A1 * | 6/2003 | Karafillis | F01D 25/16 60/785 |
| 2007/0193276 A1 * | 8/2007 | Corattiyil et al. | 60/782 |
| 2010/0209229 A1 | 8/2010 | Propheter-Hinckley et al. | |
| 2010/0254807 A1 | 10/2010 | Smoke et al. | |
| 2011/0182719 A1 * | 7/2011 | Deo | F01D 11/02 415/173.1 |
| 2014/0099188 A1 * | 4/2014 | Bordne | F01D 25/18 415/112 |

FOREIGN PATENT DOCUMENTS

| | | |
|---|---|---|
| EP | 1895108 | 3/2008 |
| EP | 1936123 A2 | 6/2008 |
| EP | 2657465 A1 | 10/2013 |
| GB | 2152146 A | 7/1985 |
| WO | 0131235 A2 | 5/2001 |
| WO | 2006059981 A2 | 6/2006 |

OTHER PUBLICATIONS

Non-Final Office Action issued in connection with corresponding U.S. Appl. No. 13/713,018 on Sep. 15, 2015.

Christopher Mark Bordne et al. U.S. Appl. No. 13/713,018, filed Dec. 13, 2012.

European Search Report issued in connection with related EP Application No. EP13165240.6 on Apr. 17, 2014.

Office issued in connection with related U.S. Appl. No. 13/713,018 on Sep. 17, 2014.

Office issued in connection with related U.S. Appl. No. 13/713,018 on Mar. 12, 2015.

\* cited by examiner

MITIGATING VORTEX PUMPING EFFECT UPSTREAM OF OIL SEAL

CROSS REFERENCE TO RELATED APPLICATION

This application claims the benefit of U.S. Provisional Application No. 61/639,315, filed Apr. 27, 2012, which is incorporated by reference herein in its entirety.

The subject matter of this application may be related to the subject matter of copending U.S. patent application Ser. No. 13/713,018, titled "WIDE DISCOURAGER TOOTH," filed on even date herewith, which is incorporated by reference herein its entirety.

BACKGROUND

The subject matter disclosed herein relates generally to apparatuses and methods for mitigating vortex pumping of pressurization air in a turbine engine. More specifically, not by way of limitation, present embodiments relate to apparatuses and methods for mitigating vortex pumping effect on air pressure around an oil sump of a turbine engine.

In the turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly including a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles turn the hot combustion gas in a manner to maximize extraction at the adjacent downstream turbine blades.

The first and second rotor disks are joined to the compressor by a corresponding rotor shaft for powering the compressor during operation. The turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

As the combustion gasses flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

One source of vortices in a turbine engine may be labyrinth seals which can create significant tangential velocity. This may be caused by viscous drag effects from the rotating components of the turbine engine, for example the seal or arm extending to support a seal. In an otherwise non-swirling fluid flow, the creation of these vortices can create significant pressure drop when associated with a change in radius of the swirling fluid. In many cases, such a pressure drop may be highly undesirable.

In certain oil sumps, minimum pressure differential may be used to prevent oil leakage and such pressure differential may be related to scavenge capability. When the pressure differential around a sump is too high, oil leakage prevention characteristics may be compromised. As utilized in the present disclosure, "pressure differential around a sump" may refer to the maximum difference in air pressure on the dry side of all oil seals for an individual sump.

The problem: In some oil sump configurations, excessive pressure differential around an oil sump may cause undesirable oil leakage.

BRIEF DESCRIPTION OF THE INVENTION

At least one solution for the above-mentioned problem(s) is provided by the present disclosure to include example embodiments, provided for illustrative teaching and not meant to be limiting.

At least some aspects of the present disclosure may involve an oil sump and the reduction of pressure loss upstream of an oil seal due to vortex pumping. Pressurized air flow may be directed away from a pathway wherein vortices may be formed. The pressurized flow may be at least partially isolated from the effect of the vortex on static air pressure by a pressurization tooth seal. Some example embodiments may contribute to maintaining proper air pressure at an adjacent oil sump seal and reducing leakage through that seal.

An example oil sump seal pressurization apparatus for a turbine engine according to at least some aspects of the present disclosure may include an oil sump comprising at least one bearing mounted therein, the bearing allowing rotation of a shaft with respect to the sump; an oil seal operatively disposed between a non-rotating structural member of the sump and the shaft, the oil sealing having an inward side exposed to an interior of the oil sump and an outward side; a generally radially inwardly oriented passage arranged to supply pressurization air to the outward side of the oil seal; a generally radially outwardly oriented pathway arranged to receive at least some of the pressurization air from the passage, the pathway being at least partially defined by a generally radially outwardly extending arm disposed on the shaft, the arm rotating with the shaft; and/or a windage shield at least partially separating the passage and the pathway, the windage shield being operatively mounted to the non-rotating structural member of the sump.

An example oil sump seal pressurization apparatus for a turbine engine according to at least some aspects of the present disclosure may include a non-rotating oil sump housing a bearing, the bearing supporting a rotatable shaft; an oil seal at least partially isolating an interior of the oil sump, the oil seal operatively acting between a non-rotating structural member of the sump and the rotatable shaft; a passage arranged to supply pressurization air to an outward side of the oil seal with respect to the oil sump; a sump pressurization cavity disposed at least partially around the oil sump, the sump pressurization cavity comprising a volume arranged to supply the pressurization air to the passage; a non-rotatable windage shield disposed within the sump pressurization cavity between the volume and a rotatable arm disposed on the shaft; and/or a pressurization tooth fluidicly interposing the passage and the rotatable arm, the pressurization tooth restricting flow of the pressurization air from the passage towards the rotatable arm.

An example oil sump seal pressurization apparatus for a turbine engine according to at least some aspects of the present disclosure may include a non-rotating oil sump housing a bearing, the bearing supporting a rotatable shaft; an oil seal at least partially isolating an interior of the oil sump, the oil seal operatively acting between a non-rotating structural member of the sump and the rotatable shaft; a passage arranged to supply pressurization air to an outward side of the oil seal with respect to the oil sump; a sump pressurization cavity disposed at least partially around the oil sump, the sump pressurization cavity comprising a volume arranged to supply the pressurization air to the passage; a non-rotatable windage shield disposed within the sump pressurization cavity between the volume and a rotatable arm disposed on the shaft; a pressurization tooth fluidicly interposing the passage and the rotatable arm, the pressurization tooth restricting flow of the pressurization air from the passage towards the rotatable arm; and/or a discourager tooth disposed on the shaft and extending radially outward towards a non-rotating land, the land being disposed axially between the passage and the drain, the discourager tooth being spaced apart from the land in a generally radial direction by a gap having a width, the discourager tooth including an upper surface having a width. The pressurization tooth may extend radially outwardly from the shaft generally towards the windage shield. The windage shield may extend generally radially outward with respect to the shaft.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, gas turbine engines, and, more specifically, apparatuses and methods for mitigating vortex pumping of pressurization air in a turbine engine. Some example embodiments according to at least some aspects of the present disclosure may relate to apparatuses and methods for mitigating vortex pumping effect on air pressure around an oil sump of a turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Some example embodiments may apply to gas turbine engines used in connection with aviation, power generation, industrial, or marine uses in which a combustor burns fuel and discharges hot combustion gas into a high pressure turbine. The instant structures and methods may help balance pressure across an oil sump for either a low or a high speed turbine shaft and, more specifically, may limit pressure loss due to vortex pumping of air upstream of an oil seal for the oil sump. Various example embodiments according to at least some aspects of the present disclosure may be applicable to vented as well as non-vented oil sump configurations.

The terms fore (or forward) and aft are used with respect to the engine axis and generally mean toward the front of the turbine engine or the rear of the turbine engine in the direction of the engine axis.

Figure 1:
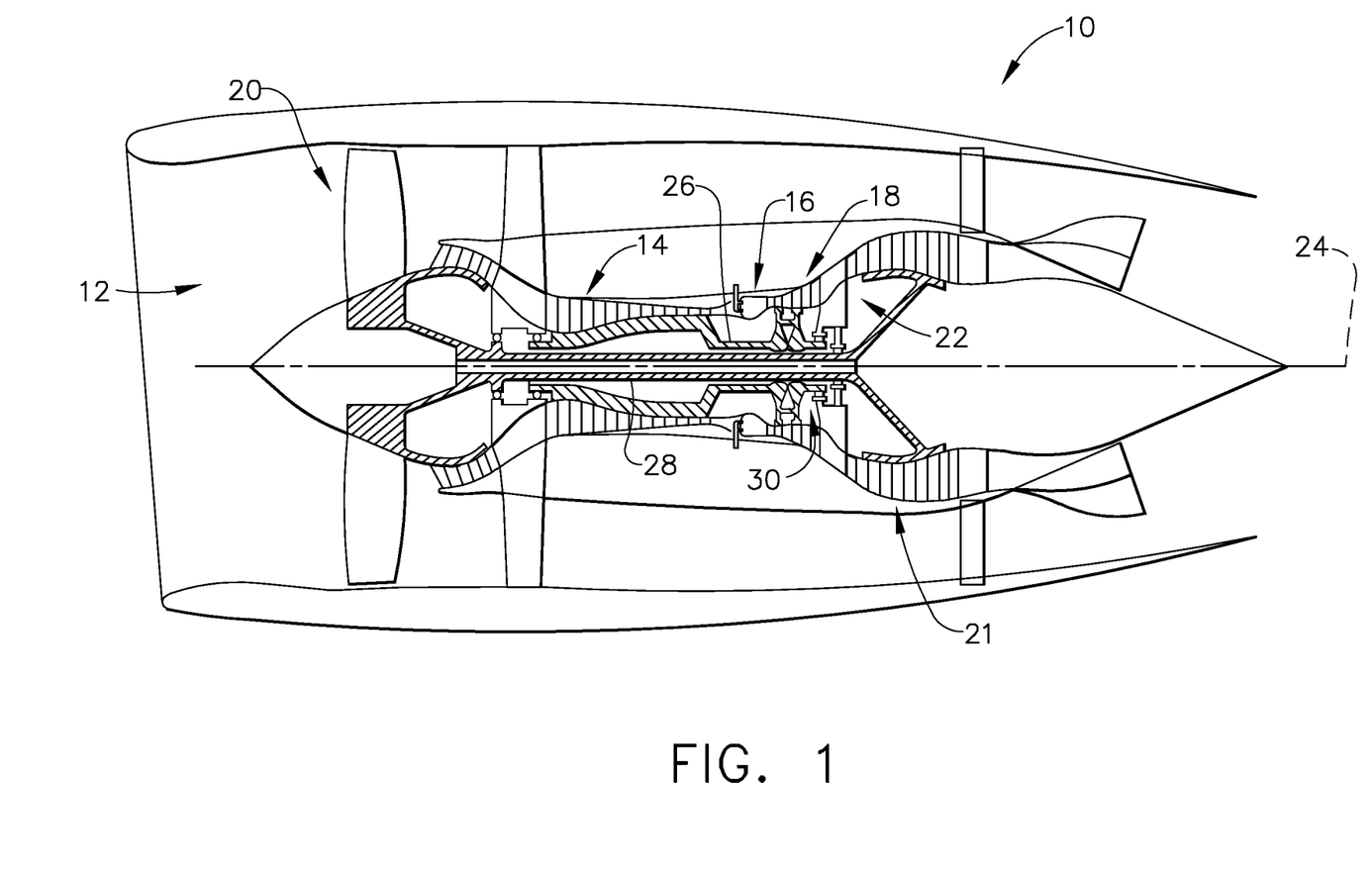
FIG. 1 is a side section view of a gas turbine engine.
Figure 2:
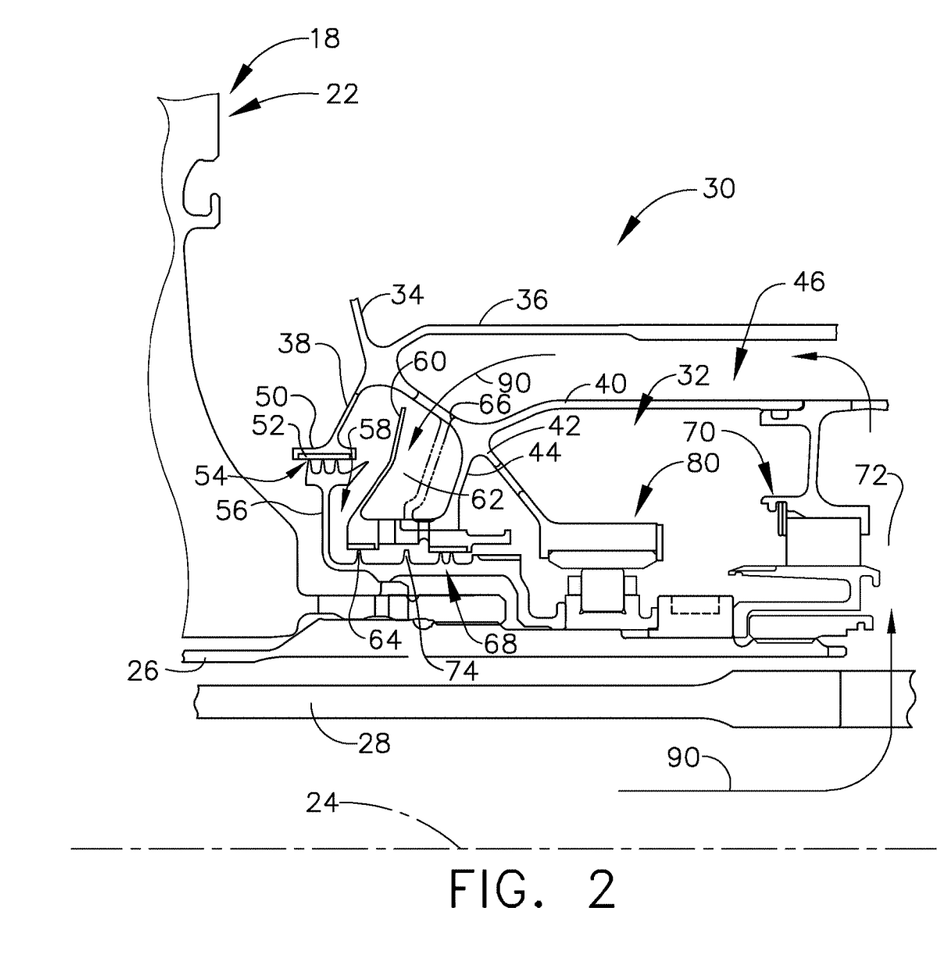
FIG. 2 is a side section view of an example oil sump and related seal structure.
Figure 3:
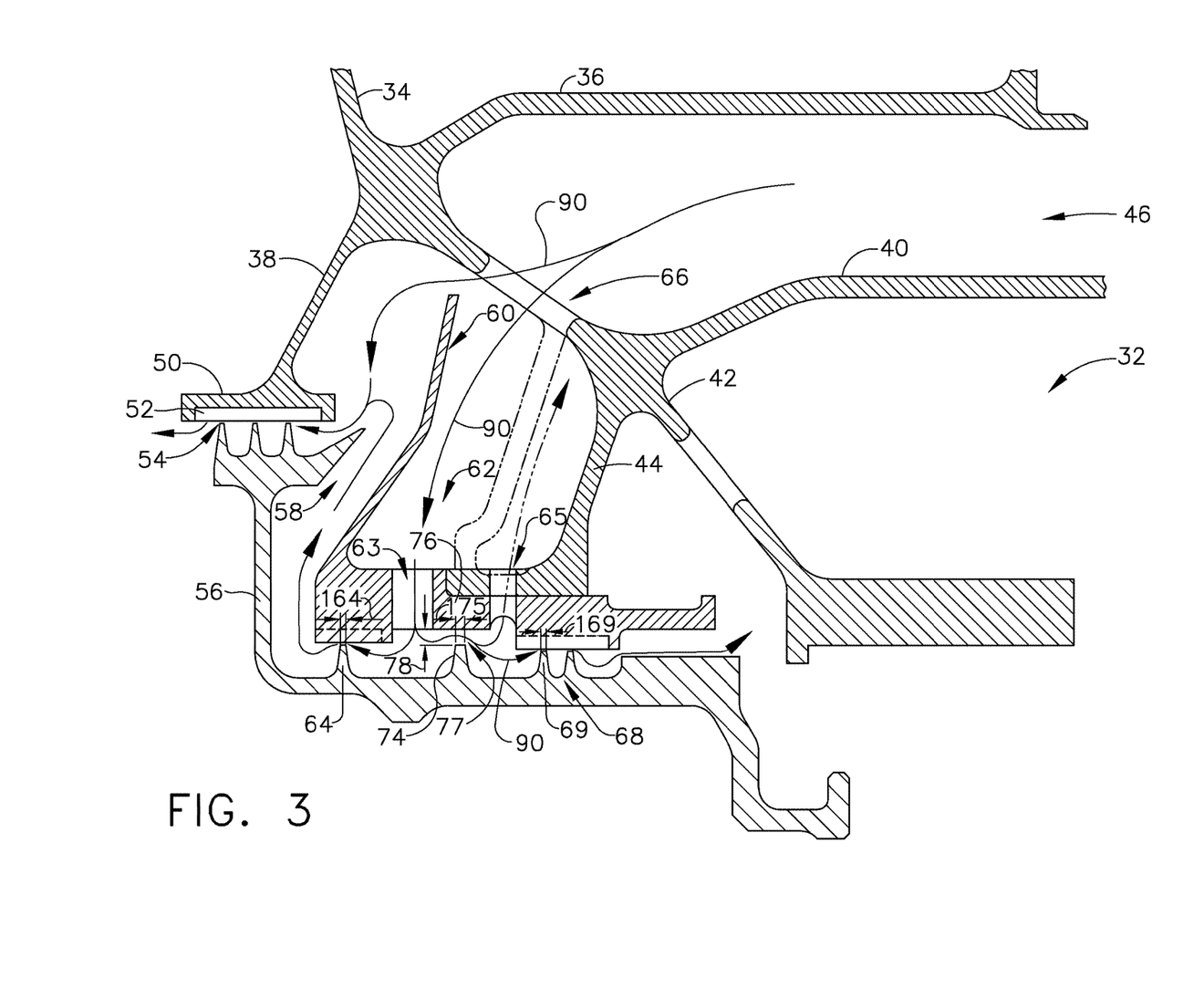
FIG. 3 is a detailed view of an example oil sump and related seal structure, all in accordance with at least some aspects of the present disclosure.

FIGS. 1-3 illustrate various example oil sump seal pressurization apparatuses and methods of maintaining limited pressure drop across an oil sump, according to at least some embodiments of the present disclosure. Some example embodiments may limit the effect of vortex pumping on static pressure and thereby limit pressure differential around the oil sump.

Referring initially to FIG. 1, a schematic side section view of a gas turbine engine 10 is shown having an engine inlet end 12, a compressor 14, a combustor 16 and a multi-stage high pressure turbine 18. The gas turbine 10 may be used for aviation, power generation, industrial, marine, or like applications. The gas turbine 10 is generally axis-symmetrical about axis 24. Depending on the usage, the engine inlet end 12 may alternatively contain multistage compressors rather than a fan. In operation, air enters through the air inlet end 12 of the engine 10 and moves through at least one stage of compression where the air pressure is increased and directed to the combustor 16. The compressed air is mixed with fuel and burned providing the hot combustion gas which exits a combustor 16 toward the high pressure turbine 18. At the high pressure turbine 18, energy is extracted from the hot combustion gas causing rotation of turbine blades which in turn cause rotation of the high pressure shaft 26, which passes toward the front of the engine to continue rotation of the one or more compressors 14. A second shaft, low pressure shaft 28, mechanically couples a low pressure turbine 21 and a turbo fan 20 or inlet fan blades, depending on the turbine design.

The high pressure shaft 26 rotates about the axis 24 of the engine. The high pressure shaft 26 extends through the turbine engine 10 and is supported by bearings. The bearings operate in oil sumps to cool parts during the high speed revolution. Fluid leakage in and around rotating parts may significantly increase fuel consumption and reduce engine efficiency resulting in undesirable operating parameters for the turbine engine. Additionally, high pressure gasses, such as combustion gasses within the turbine and compressor discharge area, may leak from high pressure areas to low pressure areas and controlling such leakage is preferred. Control or inhibition of such leakage is performed in a variety of manners including, for example, labyrinth seals and brush seals positioned between areas of differential pressure. Over time, however, increased exposure to these high pressure and thermal areas may result in loss of seal effectiveness.

In gas turbine engines it is frequently necessary or desirable to isolate a volume, which may include one or more rotating parts, in order to confine a fluid, such as oil, and to prevent such fluid from flowing into adjacent areas or flowing out of the volume. For example, in a gas turbine engine, it may be necessary to confine a liquid lubricant associated with shaft bearings to a volume surrounding the bearing in order to prevent amounts of the fluid or oil from leaking from the volume or sump. In oil sump structures, pressurized air may be utilized to pass around and/or through the sump area in order to pressurize seals and prevent leakage as well as cool oil or operating components. An exemplary sump area 30 is depicted at an aft end of the shaft 26.

Some sumps, such as vented and non-vented oil sumps having a plurality of oil seals comprising labyrinth type, carbon type, or other types, may rely on a minimal pressure differential around the sump and/or between the oil seals to limit leakage. When pressure differential is too high, seals may not function appropriately, which may be undesirable. The present disclosure contemplates that, in one structure, a labyrinth seal operating at a high rate of revolution and having an adjacent passage which varies in diameter and extends to a labyrinth oil seal operating at the same rate of revolution but at a smaller diameter may result in a vortex of air upstream of the oil seal. Additionally, the present disclosure contemplates that the decrease of the radius of the vortex created by the rotation of the air near the labyrinth seal may result in pressure loss between the two seals. As a result, it may be difficult to balance the pressure differential between the seals to an acceptable level.

Referring now to FIG. 2, a side view of an aft oil sump is shown. In the aft area of the turbine engine 10, one or more sumps may be located which service bearings providing for rotation of a radially inner or low pressure shaft 28 and a radially outer shaft or high pressure shaft 26. The high pressure shaft 26 interconnects the high pressure turbine 18 and high pressure compressor 14, while the inner shaft interconnects the low pressure compressor and low pressure turbine. During operation of the turbine engine, both shafts will rotate at different speeds relative to each other. Both shafts 26, 28 may rotate in the same direction or in opposite directions.

As shown in FIG. 2, at the left-hand side of the page a high pressure turbine 18 is represented by a rotor assembly 22 which is connected to the high pressure shaft 26 extending about and rotating about the center line axis 24 as well. Also depicted radially below the high pressure shaft 26 is the low pressure shaft 28 which also rotates about the engine axis 24.

Axially aft of the rotor assembly 22 is an oil sump housing, which is defined by a plurality of structural members 34, 36, 38, 40, 42, 44 and 66. These members generally define a volume 32 above the high pressure shaft 26 wherein oil is retained for cooling and lubrication of at least one shaft bearing, and a sump pressurization cavity comprising volumes 72, 46 and 62 that surrounds the sump 32, through which pressurization air 90 is supplied to the sump seals 68, 70. Oil seal 68 may be operatively disposed between a non-rotating structural member of sump 32 (e.g., structural member 44) and shaft 26. Depending from member 38 is a sump forward air seal land 50 having a rub strip 52 located along a lower surface thereof. Beneath the sump forward air seal land 50 and engaging the rub strip 52 is a sump forward air labyrinth seal 54. Labyrinth seal 54 includes a plurality of seal teeth which extend radially upwardly to engage the rub strip 52. Axially aft of the labyrinth seal 54 and extending radially outwardly along an arm 56 is a pathway 58. Arm 56 may extend generally radially outwardly from the shaft 26 and/or may rotate with the shaft 26. In this flow path 58, due to the rotation of the arm 56 and the labyrinth seal 54, a vortex may be created, which may cause points more radially inward in the pathway 58 to be at relatively lower static pressure than points more radially outward. This variation in pressure may result in a pressure drop if air were to flow radially inwardly through pathway 58 to oil seal 68. Subsequently, a pressure differential of the pressurization flow 90 around the sump between aft seal 70 and forward seal 68 may be realized.

Moving axially aft from the windage shield 60 is a bypass flow path 62. Beneath the windage shield 60 is a tooth seal or a pressurization tooth 64 (e.g., a single tooth). The pressurization tooth 64 may substantially seal the flow path 58 and/or may substantially inhibit air in the lower pressure pathway (e.g., flow path 58), wherein the vortex may be created, from decreasing the pressure on the aft side of the pressurization tooth 64. To the aft of pressurization tooth 64 is a labyrinth oil seal 68, which defines a forward seal for the oil sump 32. The aft seal 70 defines the opposite seal for the oil sump 32. Within the sump 32 is a bearing assembly 80, for example a roller bearing assembly, which may allow rotation of shaft 26.

As shown in the figure, pressurization air 90 moves radially upwardly into a flow path 72 aft of the sump 32. The flow 90 moves upwardly through the flow path 72 and through an aperture in the structural member 40 and, for purposes of this description, turns forward relative to the axial direction of the engine 10, toward the windage shield 60. In the structural member 42, the flow 90 passes through a member 66 and moves downwardly through the bypass flow path 62 extending along the aft side of the windage shield 60. As a result, the vortex created by rotation in the flow area 58 may be substantially separated by the windage shield 60 from the flow 90 moving through the bypass flow path 62.

As shown in the figure, it is desirable that the pressure at the flow path area 72 adjacent to aft seal 70 and the pressure at the labyrinth oil seal 68 be close to equal or that the pressure at the labyrinth oil seal 68 be very slightly lower than the pressure at the aft seal 70. The air flow 90 at the seal 68 creates a barrier to oil from the sump 32. When the pressure differential is too high, as was the case with the vortex in path 58, oil from the sump 32 could leak across the labyrinth oil seal 68. Thus, the pressure differential around the oil sump 32 is minimized, thereby ensuring proper seal performance and inhibiting leakage from the seals.

FIG. 3 is a detailed view of the labyrinth seal 54 and a windage shield 60 adjacent the oil sump 32. The windage shield 60 extends upwardly above a pressurization tooth 64 and may be mounted to a non-rotating structural member of the sump (e.g., structural member 44). Axially forward of the windage shield 60 is the flow path 58, which has a varying diameter wherein a vortex may form due to the high speed rotation of the labyrinth seal 54 and arm 56 and varying diameter of path 58. However, the windage shield 60 directs a portion of the flow 90 to the aft side of the shield 60 and through a passage 63, which may be generally radially inwardly oriented. As a result, the vortex in the area of the pathway 58 is inhibited from interacting with the flow path 62 on the aft side of the windage shield 60.

The pressurization tooth 64 limits the pressure drop associated with the vortex on the forward side of the windage shield 60 from substantially adversely affecting pressure on the aft side of the pressurization tooth 64. This results in higher pressure downstream of passage 63. Pressurization tooth 64 may generally restrict flow of pressurization air 90 therepast.

As the flow of pressurized air 90 moves into the pathway 62 aft of the windage shield 60, some of the pressurized air 90 may turn toward the pressurization tooth 64, move through that seal into the pathway 58, and experience a drop in pressure as it passes through the restriction created by the seal. As the other portion of the flow 90 moves aft toward the labyrinth seal 68, pressure may be substantially maintained at the seal 68 to inhibit oil from sump 32 from moving forward through the seal 68 and leaking. Since the oil seal 68 functions as a seal for the oil sump 32, the pressurized flow 90 on the forward side or outward side of the seal 68 inhibits the passage of oil from the aft side or inward side of the oil seal 68 to the forward side or outward side.

As one skilled in the art will understand, the windage shield 60 directs pressurized flow 90 to bypass an area 58 wherein a vortex is formed due to rotation. Additionally, the pressurization tooth 64 may prevent the necessarily lower pressure zone on the forward side of the tooth 64 from substantially affecting the static pressure of the air on the aft side of the tooth 64.

Some example embodiments may include an aperture 65, which may operate as a drain for leaked oil and/or may vent at least some of the pressurization air 90. Aperture 65 may be positioned axially between passage 63 and oil seal 68.

Referring to FIGS. 2 and 3, a discourager tooth 74 may be located between passage 63 and labyrinth oil seal 68. Discourager tooth 74 may be disposed on shaft 26 and/or may extend radially outwards towards a non-rotating land 76. Land 76 may be disposed axially between passage 63 and oil seal 68. Discourager tooth 74 may be spaced apart from land 76 in a generally radial direction by a gap 77 having a width 78. Discourager tooth 74 may include an upper surface having a width 175. Pressurization tooth 64 may have a width 164 which may be measured in a generally axial direction with respect to engine axis 24 (FIG. 1). Oil seal 68 may include one or more teeth 69 having a width 169 which may be measured in a generally axial direction with respect to engine axis 24 (FIG. 1).

In some example embodiments, the discourager tooth 74 may be at least about 1.5, 2.0, or 2.5 times the width of adjacent teeth on the high pressure shaft 26, such as the pressurization tooth 64 and the exemplary teeth 69 of the labyrinth seal 68. In other words, in some example embodiments, discourager tooth width 175 may be at least about 1.5 times pressurization tooth width 164 and/or seal tooth width 169. In some example embodiments, discourager tooth width 175 may be at least about 2.0 times pressurization tooth width 164 and/or seal tooth width 169. In some example embodiments, discourager tooth width 175 may be at least about 2.5 times pressurization tooth width 164 and/or seal tooth width 169.

In some example embodiments, a ratio of discourager tooth width 175 to gap width 78 may be greater than about 0.5. In some example embodiments, a ratio of discourager tooth width 175 to gap width 78 may be greater than about 1.0. In some example embodiments, a ratio of discourager tooth width 175 to gap width 78 may be greater than about 4.0.

Accordingly, embodiments of the instant apparatus provides mitigation of pumping effect in the area of the sump forward air seal 54 and arm 56 and/or minimize pressure loss across the oil sump 32 from the aft seal 70 to the labyrinth oil seal 68. By inhibiting pressure loss across the sump, pressurization air 90 may be more effectively utilized at the labyrinth seal 68 to deter oil leakage from the sump 32.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An oil sump seal pressurization apparatus for a turbine engine, the oil sump seal pressurization apparatus comprising:
   an oil sump comprising at least one bearing mounted therein, the bearing allowing rotation of a shaft with respect to the sump;
   an oil seal operatively disposed between a non-rotating structural member of the sump and the shaft, the oil sealing having an inward side exposed to an interior of the oil sump and an outward side;
   a generally radially inwardly oriented passage arranged to supply pressurization air to the outward side of the oil seal;
   a generally radially outwardly oriented pathway arranged to receive at least some of the pressurization air from the passage, the pathway being at least partially defined by a generally radially outwardly extending arm disposed on the shaft, the arm rotating with the shaft; and
   a windage shield at least partially separating the passage and the pathway, the windage shield being operatively mounted to the non-rotating structural member of the sump.

2. The oil sump seal pressurization apparatus of claim 1, further comprising a pressurization tooth operatively disposed between the passage and the pathway, the pressurization tooth restricting flow of the pressurization air therepast.

3. The oil sump seal pressurization apparatus of claim 2, further comprising a discourager tooth disposed on the shaft and extending radially outward towards a non-rotating land, the land being disposed axially between the passage and the oil seal, the discourager tooth being spaced apart from the land in a generally radial direction by a gap having a width, the discourager tooth including an upper surface having a width;
   wherein the discourager tooth width is at least about 1.5 times a width of the pressurization tooth.

4. The oil sump seal pressurization apparatus of claim 2, wherein the pressurization tooth extends radially outwardly from the shaft generally towards the windage shield.

5. The oil sump seal pressurization apparatus of claim 1, wherein the windage shield extends generally radially outward with respect to the shaft.

6. The oil sump seal pressurization apparatus of claim 1, wherein an air seal is disposed on the arm.

7. The oil sump seal pressurization apparatus of claim 1, further comprising
   a drain arranged to allow draining of oil and venting of at least some of the pressurization air, the drain being positioned axially between the passage and the oil seal; and
   a discourager tooth disposed on the shaft and extending radially outward towards a non-rotating land, the land being disposed axially between the passage and the drain, the discourager tooth being spaced apart from the land in a generally radial direction by a gap having a width, the discourager tooth including an upper surface having a width.

8. The oil sump seal pressurization apparatus of claim 7, wherein the discourager tooth width is at least about 2.0 times a width of the pressurization tooth.

9. The oil sump seal pressurization apparatus of claim 7, wherein a ratio of discourager tooth width to gap width is greater than about 0.5.

10. An oil sump seal pressurization apparatus for a turbine engine, the oil sump seal pressurization apparatus comprising
    a non-rotating oil sump housing a bearing, the bearing supporting a rotatable shaft;
    an oil seal at least partially isolating an interior of the oil sump, the oil seal operatively acting between a non-rotating structural member of the sump and the rotatable shaft;
    a passage arranged to supply pressurization air to an outward side of the oil seal with respect to the oil sump;
    a sump pressurization cavity disposed at least partially around the oil sump, the sump pressurization cavity comprising a volume arranged to supply the pressurization air to the passage;
    a non-rotatable windage shield disposed within the sump pressurization cavity between the volume and a rotatable arm disposed on the shaft; and
    a pressurization tooth fluidicly interposing the passage and the rotatable arm, the pressurization tooth restricting flow of the pressurization air from the passage towards the rotatable arm.

11. The oil sump seal pressurization apparatus of claim 10, wherein the pressurization tooth extends radially outwardly from the shaft generally towards the windage shield.

12. The oil sump seal pressurization apparatus of claim 10, wherein the windage shield extends generally radially outward with respect to the shaft.

13. The oil sump seal pressurization apparatus of claim 10, wherein an air seal is disposed on the arm.

14. The oil sump seal pressurization apparatus of claim 10,
    further comprising a discourager tooth disposed on the shaft and extending radially outward towards a non-rotating land, the land being disposed axially between the passage and the oil seal, the discourager tooth being spaced apart from the land in a generally radial direction by a gap having a width, the discourager tooth including an upper surface having a width.

15. The oil sump seal pressurization apparatus of claim 14, wherein the discourager tooth width is at least about 1.5 times a width of the pressurization tooth.

16. An oil sump seal pressurization apparatus for a turbine engine, the oil sump seal pressurization apparatus comprising
- a non-rotating oil sump housing a bearing, the bearing supporting a rotatable shaft;
- an oil seal at least partially isolating an interior of the oil sump, the oil seal operatively acting between a non-rotating structural member of the sump and the rotatable shaft;
- a passage arranged to supply pressurization air to an outward side of the oil seal with respect to the oil sump;
- a sump pressurization cavity disposed at least partially around the oil sump, the sump pressurization cavity comprising a volume arranged to supply the pressurization air to the passage;
- a non-rotatable windage shield disposed within the sump pressurization cavity between the volume and a rotatable arm disposed on the shaft;
- a pressurization tooth fluidicly interposing the passage and the rotatable arm, the pressurization tooth restricting flow of the pressurization air from the passage towards the rotatable arm; and
- a discourager tooth disposed on the shaft and extending radially outward towards a non-rotating land, the land being disposed axially between the passage and the drain, the discourager tooth being spaced apart from the land in a generally radial direction by a gap having a width, the discourager tooth including an upper surface having a width;
- wherein the pressurization tooth extends radially outwardly from the shaft generally towards the windage shield; and
- wherein the windage shield extends generally radially outward with respect to the shaft.

17. The oil sump seal pressurization apparatus of claim 16, further comprising a drain arranged to allow draining of oil and venting of at least some of the pressurization air, the drain being positioned axially between the passage and the oil seal.

18. The oil sump seal pressurization apparatus of claim 16, wherein the discourager tooth width is at least about 1.5 times a width of the pressurization tooth.

19. The oil sump seal pressurization apparatus of claim 16, wherein the discourager tooth width is at least about 2.0 times a width of the pressurization tooth.

20. The oil sump seal pressurization apparatus of claim 16, wherein the discourager tooth width is at least about 2.5 times a width of the pressurization tooth.

* * * * *

UNITED STATES PATENT AND TRADEMARK OFFICE
CERTIFICATE OF CORRECTION

PATENT NO. : 9,567,908 B2  
APPLICATION NO. : 13/713013  
DATED : February 14, 2017  
INVENTOR(S) : Bordne et al.

It is certified that error appears in the above-identified patent and that said Letters Patent is hereby corrected as shown below:

In Column 1, Line 64, delete "for example" and insert -- for example, --, therefor.

In Column 6, Line 39, delete "for example" and insert -- for example, --, therefor.

In Column 8, Lines 11-12, delete "provides" and insert -- provide --, therefor.

In Column 10, Line 10, in Claim 7, delete "comprising" and insert -- comprising: --, therefor.

In Column 10, Lines 30-31, in Claim 10, delete "comprising" and insert -- comprising: --, therefor.

In Column 11, Lines 5-6, in Claim 16, delete "comprising" and insert -- comprising: --, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*